United States Patent
Choe et al.

(10) Patent No.: US 9,552,090 B2
(45) Date of Patent: Jan. 24, 2017

(54) TOUCH PANEL AND DISPLAY WITH THE SAME

(71) Applicant: LG INNOTEK CO., LTD., Seoul (KR)

(72) Inventors: Min Su Choe, Seoul (KR); Hyun Min Nah, Seoul (KR); Seung Ho Jeong, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 54 days.

(21) Appl. No.: 14/483,765

(22) Filed: Sep. 11, 2014

(65) Prior Publication Data

US 2015/0220193 A1 Aug. 6, 2015

(30) Foreign Application Priority Data

Feb. 5, 2014 (KR) .................. 10-2014-0013306
Feb. 5, 2014 (KR) .................. 10-2014-0013326

(51) Int. Cl.
*G06F 3/041* (2006.01)
*G06F 3/044* (2006.01)

(52) U.S. Cl.
CPC ............ *G06F 3/0412* (2013.01); *G06F 3/044* (2013.01)

(58) Field of Classification Search
CPC ............... H05K 2201/10287; H05K 3/103; H05K 2201/0332; H05K 1/0215; H05K 1/0216; H05K 1/0218; H05K 1/0236; H05K 1/0219; H05K 1/0253; H05K 1/0224; H05K 1/0227; H05K 1/0225; H05K 1/0259; H05K 9/0073; H05K 9/0003; G03F 3/041; G03F 3/0412; G03F 3/044; G06F 3/0412; G06F 3/044; G06F 2203/04107

See application file for complete search history.

(56) References Cited

U.S. PATENT DOCUMENTS

| | | | |
|---|---|---|---|
| 2009/0033636 A1 | 2/2009 | Toyota et al. | |
| 2011/0007011 A1* | 1/2011 | Mozdzyn | G06F 3/044 345/173 |
| 2012/0249453 A1* | 10/2012 | Tsukamoto | G06F 3/041 345/173 |
| 2012/0306776 A1* | 12/2012 | Kim | G06F 3/044 345/173 |
| 2013/0106747 A1* | 5/2013 | Choi | G06F 3/041 345/173 |
| 2013/0341079 A1* | 12/2013 | Hwang | G06F 3/044 174/268 |
| 2014/0043569 A1* | 2/2014 | Yabuta | G06F 3/041 349/104 |

(Continued)

FOREIGN PATENT DOCUMENTS

| KR | 10-2009-0013706 A | 2/2009 |
|---|---|---|
| KR | 10-2014-0019146 A | 2/2014 |

OTHER PUBLICATIONS

LG G2, Wikipedia Article, http://en.wikipedia.org/wiki/LG_G2, last visited Sep. 11, 2014 (screenshot provided).

*Primary Examiner* — Dwayne Bost
*Assistant Examiner* — Ivelisse Martinez Quiles
(74) *Attorney, Agent, or Firm* — Ked & Associates LLP

(57) ABSTRACT

A touch panel includes a substrate; a sensing electrode provided on the substrate to sense a position. A wire is electrically connected to the sensing electrode and a ground wire is provided adjacent to the wire. The ground wire includes a first dummy part which extends in one direction.

16 Claims, 14 Drawing Sheets

(56) References Cited

U.S. PATENT DOCUMENTS

| | | | | |
|---|---|---|---|---|
| 2014/0111442 A1* | 4/2014 | Cok | ........................ | G06F 3/044 345/173 |
| 2014/0184952 A1* | 7/2014 | Chu | ........................ | G06F 3/044 349/12 |
| 2014/0345910 A1* | 11/2014 | Wang | ...................... | G06F 3/044 174/251 |
| 2015/0060120 A1* | 3/2015 | Park | ........................ | G06F 3/044 174/257 |
| 2015/0160756 A1* | 6/2015 | Polishchuk | ............. | G06F 3/044 345/174 |

* cited by examiner

TOUCH PANEL AND DISPLAY WITH THE SAME

CROSS-REFERENCE TO RELATED APPLICATIONS

This application claims priority under 35 U.S.C. §119 to Korean Application Nos. 10-2014-0013306 and 10-2014-0013326, both filed on Feb. 5, 2014, whose entire disclosures are hereby incorporated by reference.

BACKGROUND

1. Field

The embodiment relates to a touch panel and a display with the same.

2. Background

A touch window is installed on a display surface of an image display device such as a cathode ray tube (CRT), a liquid crystal display (LCD), a field emission display (FED), a plasma display panel (PDP), and an electro-luminescence device (ELD), so that a user inputs predetermined information into an electronic appliance by pressing the touch panel while viewing the image display device.

Recently, as various portable electronic devices, such as mobile phones, PDAs, and laptop computers, have been developed, the requirement for compact-size flat panel displays applicable to the portable electronic devices is gradually increased.

Metallic wiring patterns provided inside the devices or color filter patterns in the LCD have been realized through various schemes of forming patterns, such as a printing scheme and a photolithography scheme. However, according to the photolithography scheme, processes are complicated in that the photoresist must be laminated, exposed, and developed. Accordingly, the schemes have the limitation in forming fine-patterns.

According to a scheme of filling a material in the pattern, the pattern is not filled with the material in uniform amount so that the filling failure may be caused. In addition, according to the related art, due to ESD (Electric Static Discharge) generated from a touch panel, electrical signal interference is caused so that the accuracy of a touch is deteriorated.

BRIEF DESCRIPTION OF THE DRAWINGS

The embodiments will be described in detail with reference to the following drawings in which like reference numerals refer to like elements wherein.

DETAILED DESCRIPTION

In the description of embodiments, it will be understood that when a layer (or film) is referred to as being 'on' another layer or substrate, it can be directly on another layer or substrate, or intervening layers may also be present. Further, it will be understood that when a layer is referred to as being 'under' another layer, it can be directly under another layer, and one or more intervening layers may also be present. In addition, it will also be understood that when a layer is referred to as being 'between' two layers, it can be the only layer between the two layers, or one or more intervening layers may also be present.

Figure 1:
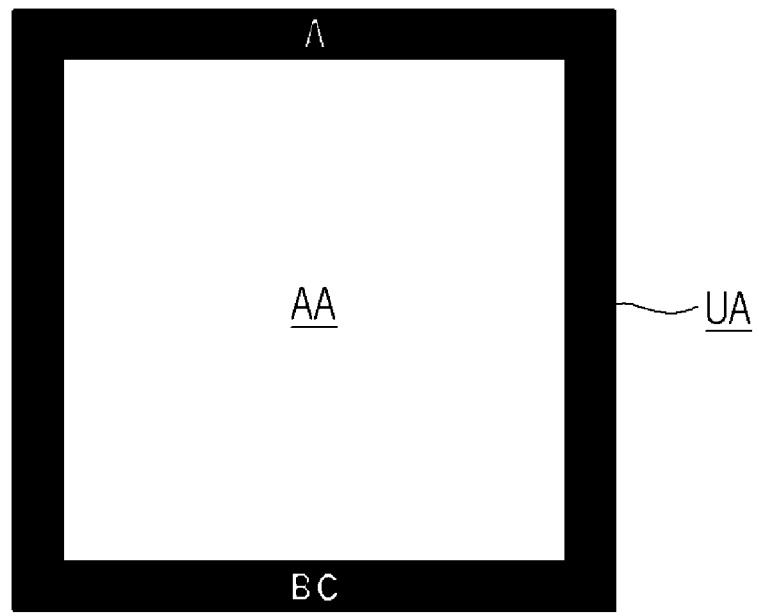
FIG. 1 is a schematic plan view showing a touch panel according to an embodiment.
Figure 2:
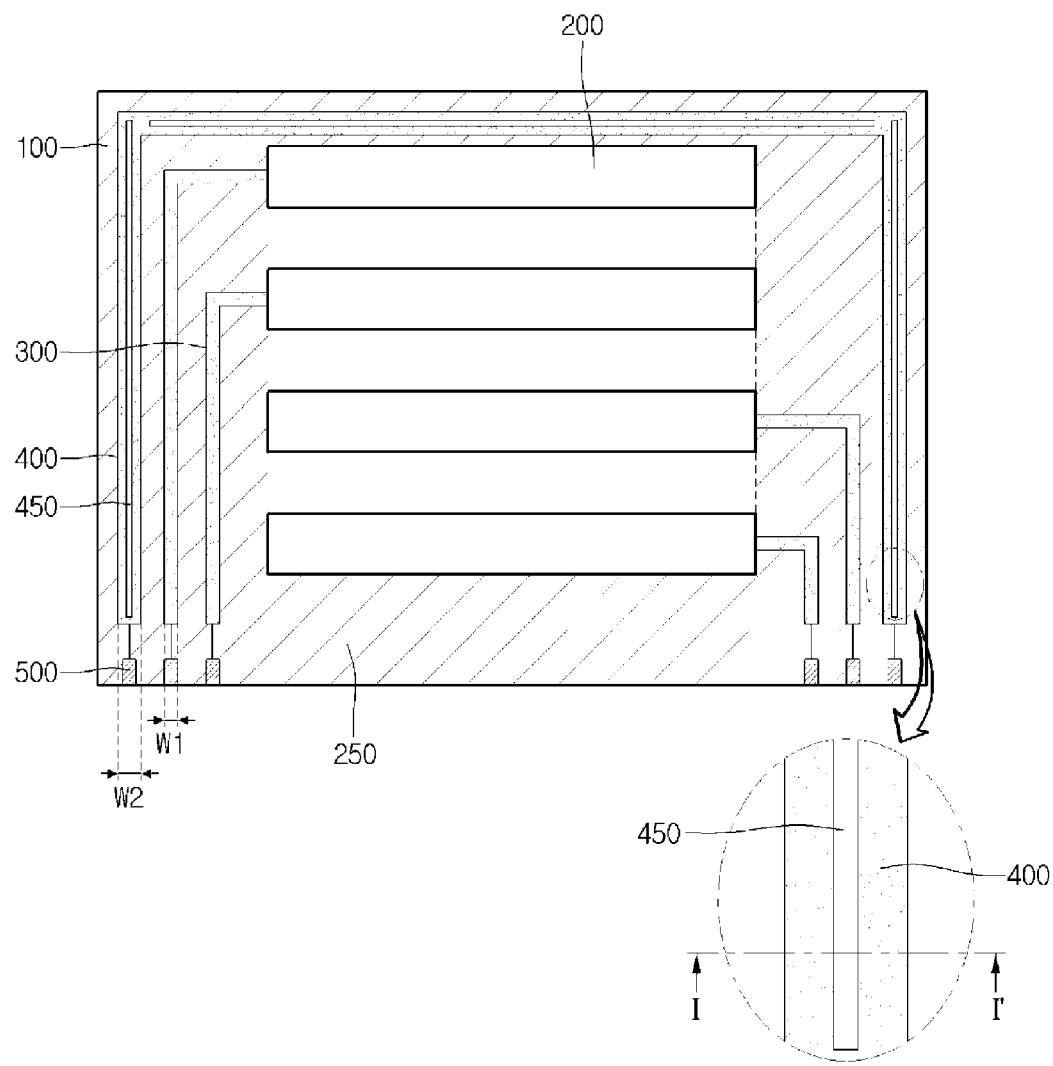
FIG. 2 is a plan view showing a touch panel according to a first embodiment.

Referring to FIGS. 1 and 2, a touch panel 10 according to the embodiment includes a substrate 100 having an active area AA, in which a position of an input by a finger or an input device is detected, and an inactive or unactive area UA provided at a peripheral portion of the active area AA. The substrate 100 may be transparent. The support substrate 100 may be flexible or rigid. For example, the substrate 100 may include a glass substrate or a plastic substrate including a polyethylene terephthalate (PET) film or resin. However, the embodiment is not limited thereto. Various materials to form a sensing electrode 200 and a wire 300 may be formed on the substrate 100.

The active area AA may be provided therein with sensing electrodes 200 that may sense a localized input. Although FIG. 2 shows the sensing electrode 200 having a bar shape, the embodiment is not limited thereto. Accordingly, the sensing electrode 200 may have various shapes capable of sensing whether the input device such as the finger is touched.

The sensing electrode 200 may include a transparent conductive material that allows electricity to flow therethrough without interrupting transmission of light. For example, the sensing electrode 200 may include various materials such as indium tin oxide (ITO), indium zinc oxide (IZO), copper oxide, a carbon nano tube (CNT), graphene, or a nanowire.

FIG. 2 illustrates the sensing electrode 200 extending in one direction, but the embodiment is not limited thereto. Accordingly, the sensing electrode 200 may include two types of sensing electrodes 200 having a sensing electrode extending in one direction and a sensing electrode extending in another direction crossing the one direction.

The sensing electrode patterns may be formed in a various schemes according to a touch panel structure. For example, the sensing electrode patterns may be formed on one surface of the cover panel together. Alternatively, one of the sensing electrode patterns may be formed on one surface of the cover panel and the other sensing electrode pattern may be formed on one surface of a substrate disposed on the cover panel.

One of the sensing electrode patterns may be formed on one surface of a first substrate disposed on the cover panel and the other sensing electrode pattern may be formed on one surface of a second substrate disposed on the first substrate. Further, one of the sensing electrode patterns may be formed on one surface of a glass or film disposed on the cover panel and the other sensing electrode pattern may be formed on the opposite surface of the glass or film.

As describe above, the touch panel according to the first embodiment may have various structures according to the formation positions of the sensing electrode patterns. However, the embodiment is not limited to the above, and the sensing electrode patterns may be formed at various positions.

If a localized input by a finger or input device touches the touch panel, the variation in capacitance occurs at the part touched with the input, and the touched portion subject to the variation of the capacitance may be detected as a touch point.

A printing layer 250 may be disposed in the inactive area UA. The printing layer 250 may extend along an edge of the substrate 100. The printing layer 250 may be formed through single tone printing, double tone printing or three tone printing. The printing layer 250 may be formed by coating black or white ink according to a desired outer appearance. The printing layer 250 allows a wire 300, which will be described below, not to be seen from an outside. In addition, a pattern for forming a desired logo may be formed on the printing layer 250.

The wire 300 for electrically connecting the sensing electrode 200 may be formed in the unactive area UA. The wire 300 may include various metallic paste materials which may form the wire 300 through a printing process. The wire 300 includes a binder and conductive particles. In this case, the binder may include an organic binder. The binder may have the content of 5% by weight to 15% by weight based on the whole weight of the wire 300. If the binder has the content of 5% by weight or more based on the whole weight of the wire 300, the adhesive strength between the wire 300 and the substrate 100 can be improved. In addition, if the binder has the content of 15% by weight or less based on the whole weight of the wire 300, the electrode material may be maintained at proper viscosity in a printing process.

The adhesive strength between the wire 300 and the substrate 100 may be improved through the binder. Since the adhesive strength of the wire 300 is improved, the wire 300 may be prevented from being delaminated from the substrate 100. In addition a printing process may be easily performed.

The conductive particles may include a metal having superior electric conductivity. For example, the conductive particles may include at least one of Cr, Ni, Cu, Al, Ag, Mo and the alloy thereof. The conductive particles are uniformly distributed in the binder so that the uniformity of the wire 300 may be improved.

A ground pattern may be disposed adjacent to the wire 300. The ground pattern may be a ground wire. For example, a ground wire 400 may be disposed adjacent to the wire 300.

A width W2 of the ground wire 400 may be greater than that W1 of the wire 300. The ground wire prevents ESD in the touch panel. The static electricity or ESD moves along a path of the ground wire 400 so that the static electricity or ESD can be prevented from being introduced into the touch panel. The ground wire 400 is disposed along the edge of the substrate 100 so that the ESD can be effectively prevented from being introduced into the touch panel. The ground wire 400 may be disposed along the entire edge of the substrate 100. The ground wire 400 is connected to the circuit substrate, so that the ESD in the touch panel can be discharged as an electrical signal. Signal interference is prevented so that the accuracy and reliability of a touch can be improved.

Figure 3:
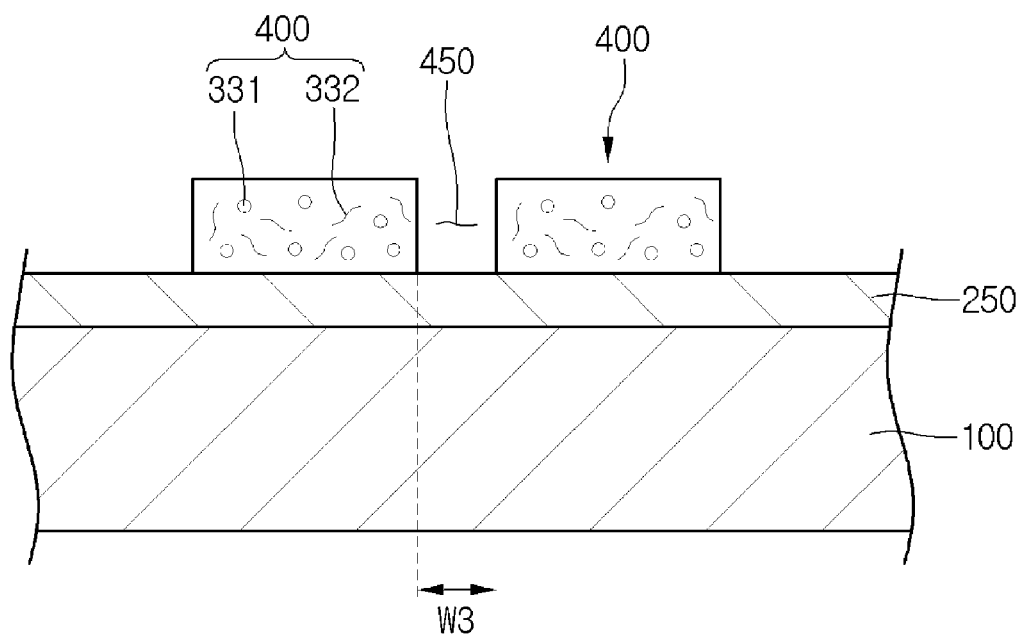
FIG. 3 is a sectional view taken along line I-I' of FIG. 2.

The ground wire 400 may include a material equal or similar to the wire 300. For example, referring to FIG. 3, the ground wire 400 may include a binder 332 and conductive particles 331. In this case, the binder 332 may include an organic binder. The binder 332 may have the content of 5% by weight to 15% by weight based on the whole weight of the ground wire 400. If the binder 332 has the content of 5% by weight or more based on the whole weight of the ground wire 400, the adhesive strength between the ground wire 400 and the substrate 100 can be improved. In addition, if the binder 332 has the content of 15% by weight or less based on the whole weight of the ground wire 400, the electrode material may be maintained at proper viscosity in a printing process.

The adhesive strength between the ground wire 400 and the substrate 100 may be improved through the binder 332. That is, since the adhesive strength of the ground wire 400 is improved, the ground wire 400 may be prevented from being delaminated from the substrate 100. In addition a printing process may be easily performed.

Meanwhile, the conductive particles 331 may include a metal having superior electric conductivity. For example, the conductive particles 331 may include at least one of Cr, Ni, Cu, Al, Ag, Mo or the alloy thereof. The conductive particles 331 are uniformly distributed in the binder 332, so that the uniformity of the ground wire 400 may be improved.

The ground wire 400 may include a first dummy part 450. The first dummy part 450 may be an open area. The first dummy part 450 may be an open area in which any conductive materials are not formed. Thus, a top surface of the printing layer 250 may be exposed through the first dummy part 450.

The first dummy part 450 may substantially extend in one direction. In detail, the first dummy part 450 may include a bar shape extending in one direction. The first dummy part 450 may extend in a longitudinal direction of the ground wire 400. For example, when the ground wire 400 extends in a long side direction of the substrate 100 on the substrate 100, the first dummy part 450 may also extend in the long side direction of the substrate 100. In addition, when the ground wire 400 may extend in a short side direction of the substrate 100 on the substrate 100, the first dummy part 450 may also extend in the short side direction of the substrate 100. That is, the directionality of the first dummy part 450 may be identical to that of the ground wire 400.

The ratio of a width W2 of the ground wire 400 to a width W3 of the first dummy part 450 may be in the range of 15:1 to 5:1. The ratio may allow the printability to be improved while preventing the electrical property of the ground wire 400 from being deteriorated due to the first dummy part 450.

For example, the width W3 of the first dummy part 450 may be in the range of 20 μm to 60 μm Thus, the process can be advantageously performed when the wire 300 is formed through a printing process. Precise and uniform printability may be secured. In addition, the ground wire 400 may be prevented from being electrically disconnected. Further, the ground wire 400 may be formed through the same printing process as the wire 300 so that process time and cost may be reduced.

Although the first dummy part 450 having the bar shape has been described above as an example, the embodiment is not limited thereto. That is, although not shown, the first dummy part 450 may have various shapes such as a shape of spaced holes, a shape of continuous holes, elliptical shape, a hemispherical shape or a polygonal shape as long as it can improve the printing quality.

An electrode pad 500 may be placed at ends of the wire 300 and the ground wire 400. The electrode pad 500 may make contact with the printed circuit board. Although not shown, a connecting terminal may be placed on one surface of the printed circuit board and the electrode pad 500 may be electrically connected to the connecting terminal. The electrode pad 500 may be formed to have a size corresponding to the connecting terminal. Various type printed circuit boards may serve as the printed circuit board. For example, the printed circuit board may include a flexible printed circuit board.

Hereinafter, a touch panel according to another embodiment will be described with reference to FIG. 4. In the following description about the touch panel according to another embodiment, the parts similar or identical to those of the previously described embodiment will be omitted for the purpose of clear and brief description.

Figure 4:
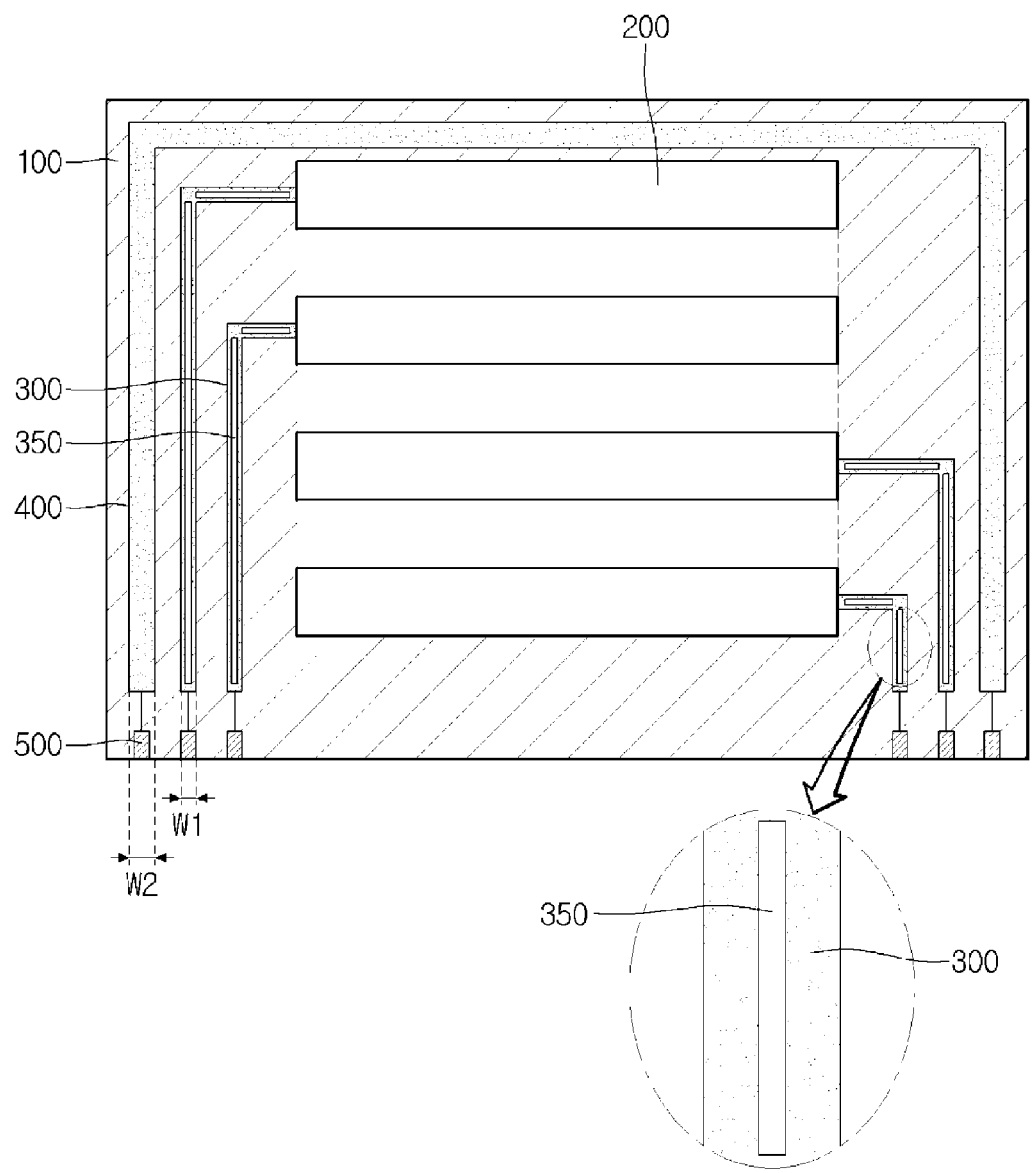
FIGS. 4 to 6 are plan views showing a touch panel according to another embodiment.

Referring to FIG. 4, the wire 300 may include a second dummy part 350. The second dummy part 350 may include an open area. For example, the second dummy part 350 may be an open area in which any conductive materials are not formed. Thus, a top surface of the printing layer 250 may be exposed through the second dummy part 350.

The second dummy part 350 may substantially extend in one direction. In detail, the second dummy part 350 may include a bar shape extending in one direction. The second dummy part 350 may extend in a longitudinal direction of the wire 350. When the wire 300 extends in a long side direction of the substrate 100 on the substrate 100, the second dummy part 350 may also extend in the long side direction of the substrate 100. When the wire 300 extends in a short side direction of the substrate 100 on the substrate 100, the second dummy part 350 may also extend in the short side direction of the substrate 100. The directionality of the second dummy part 350 may be identical to that of the wire 300.

The ratio of a width of the wire 300 to a width of the second dummy part 350 may be in the range of 15:1 to 5:1. The ratio may allow the printability to be improved while preventing the electrical property of the wire 300 from being deteriorated due to the second dummy part 350.

For example, the width of the second dummy part 350 may be in the range of 20 μm to 60 μm Thus, the process can be advantageously performed when the wire 300 is formed through a printing process. Precise and uniform printability may be secured. The wire 300 may be prevented from being short-circuited due to a pin hole. The wire 300 may be formed through the same printing process as the ground wire 400, so that process time and cost may be reduced.

Although the second dummy part 350 having the bar shape has been described above as an example, the embodiment is not limited thereto. That is, although not shown, the second dummy part 350 may have various shapes such as a shape of spaced holes, a shape of continuous holes, elliptical shape, a hemispherical shape or a polygonal shape as long as it can improve the printing quality.

Figure 5:
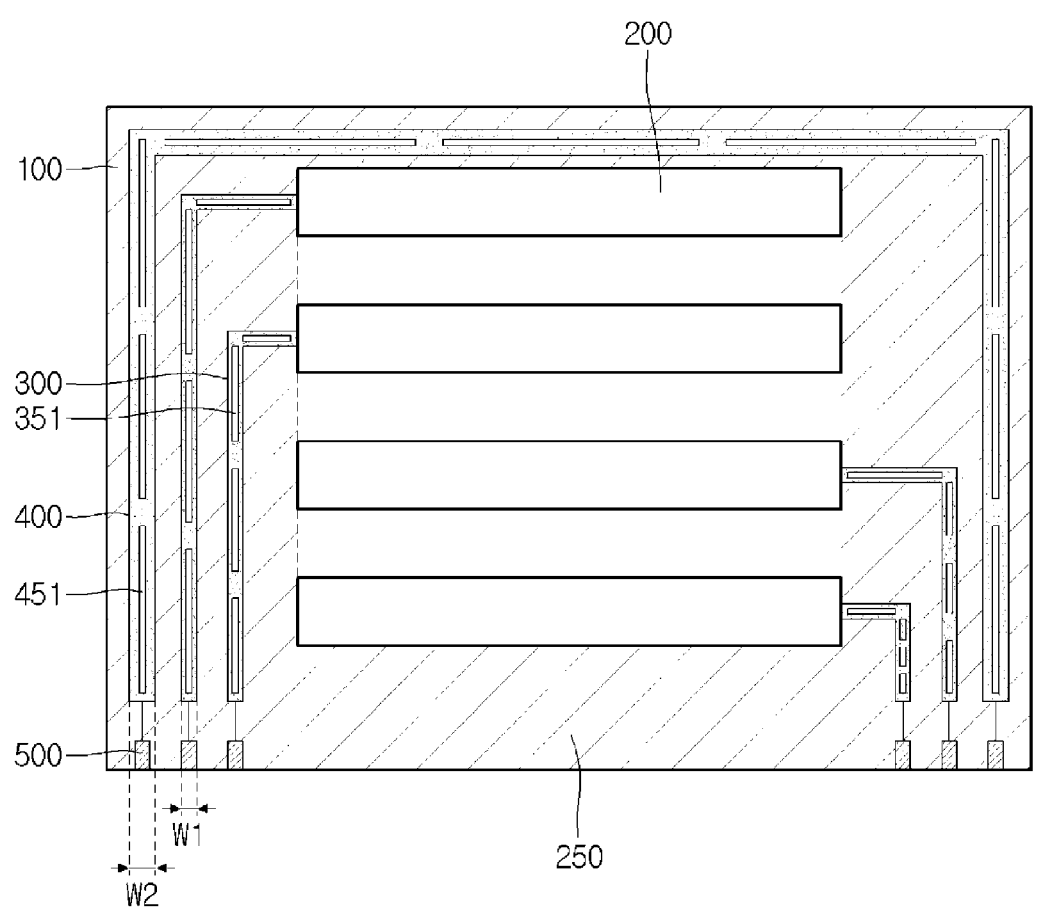

Referring to FIG. 5, in a touch panel according to another embodiment, a plurality of second dummy parts 451 may be included in the wire 300 and a plurality of first dummy parts 351 may be included in the ground wire 400. Although three first dummy parts 351 and three second dummy parts 451 are shown in FIG. 5, respectively, the embodiment is not limited thereto. That is, the number of the first and second dummy parts 351 and 451 may be variously set.

Figure 6:
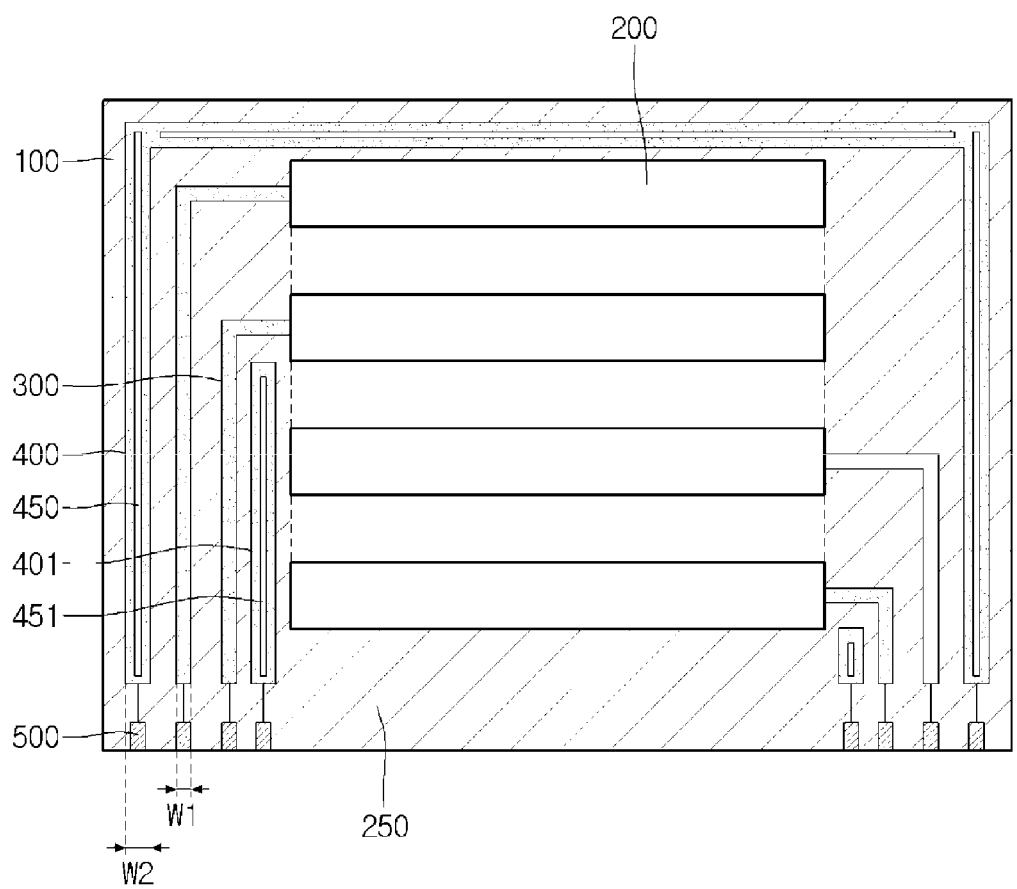

Meanwhile, referring to FIG. 6, the first and second ground wires 400 and 401 of a touch panel according to another embodiment may be disposed at both sides of the wire 300. The first and second ground wires 400 and 401 may be disposed at outmost and inmost portions of the substrate 100, respectively. Thus, ESD protection effect may be maximized in the touch panel.

Figure 7:
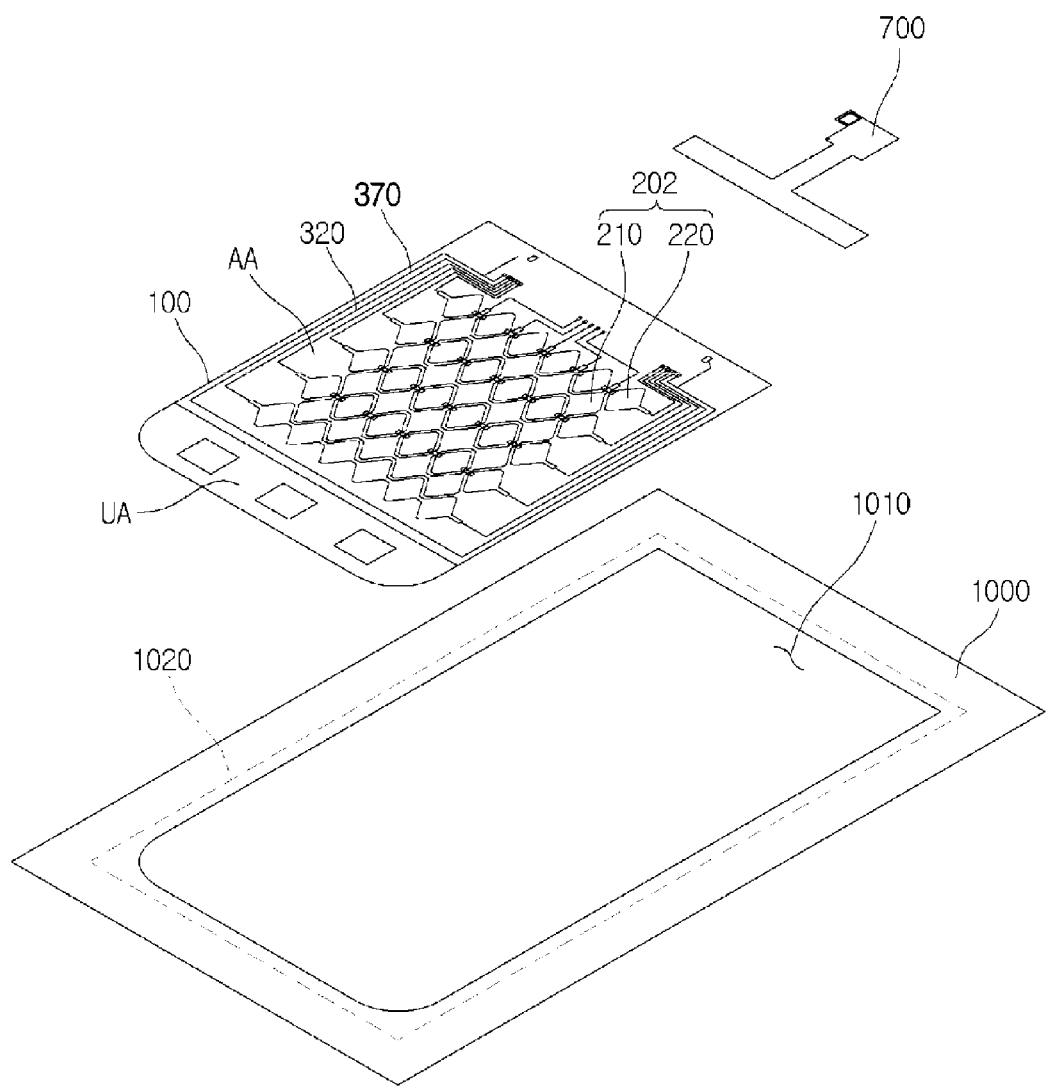
FIG. 7 is a perspective view showing a touch panel according to a second embodiment.
Figure 8:
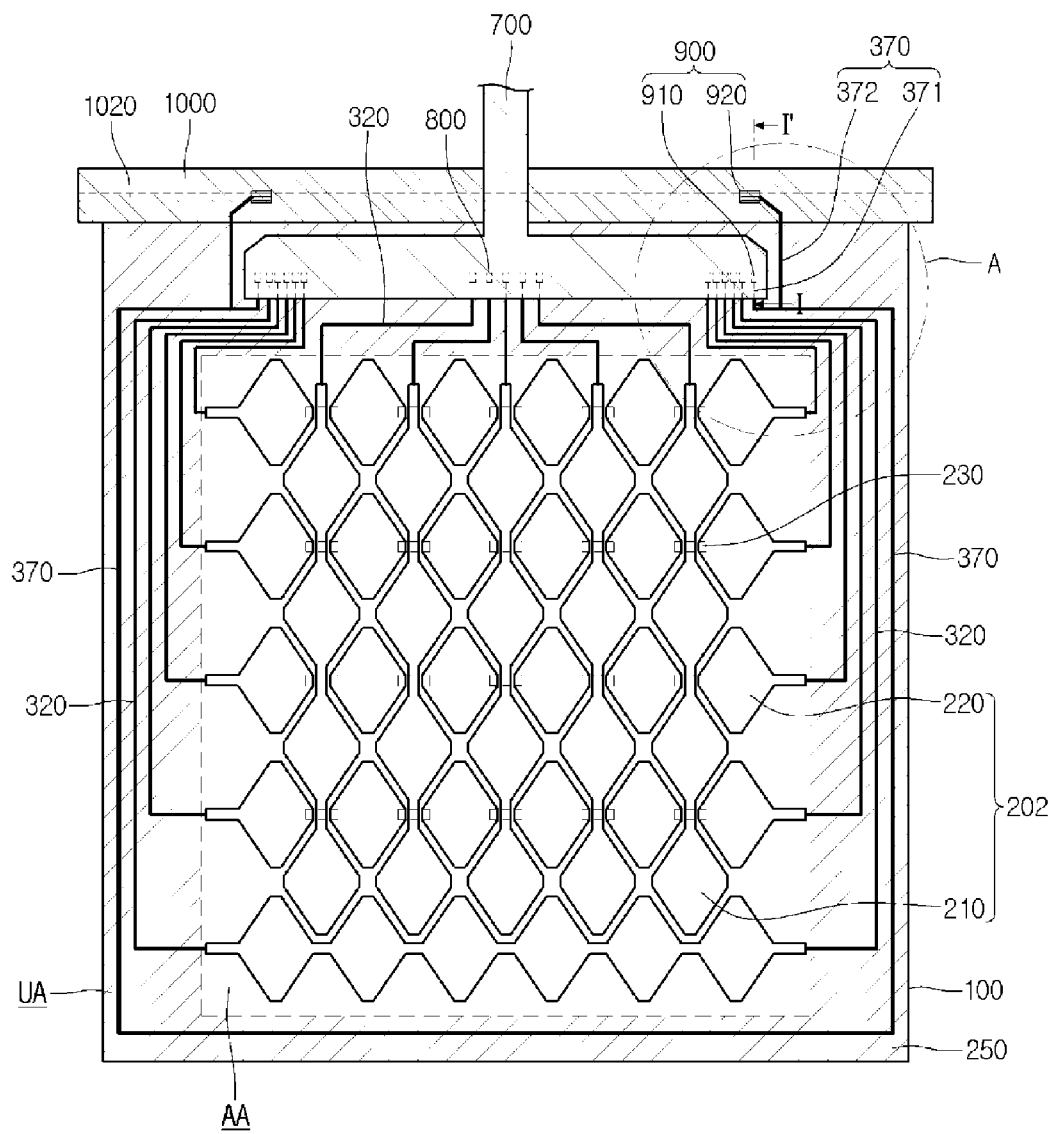
FIG. 8 is a top view showing a touch panel according to the second embodiment.

Referring to FIGS. 7 and 8, a touch panel according to the second embodiment includes a substrate 100, a sensing electrode 202, a wire 320, a ground wire 370 and a printed circuit board 700. The substrate 100 may be referred to as a cover window, but the embodiment is not limited thereto. The substrate 100 may include glass or plastic. For example, the substrate 100 may include strengthened glass, half-strengthened glass, sodalime glass, strengthened plastic, or flexible plastic.

The substrate 100 may include an active area AA and an inactive or unactive area UA. The active area AA signifies an area through which a touch instruction of a user may be input. The unactive area UA is not activated even if a user touches the unactive area UA, so the unactive area UA signifies an area through which any touch instructions cannot be input or detected.

Electrodes may be disposed in the active area AA of the substrate 100. A bridge electrode 230 and the sensing electrodes 202 may be disposed in the active area AA. The bridge electrode 230 and the sensing electrode 202 may include a transparent conductive material. For example, the bridge electrode 230 and the sensing electrode 202 may include a transparent conductive material such as indium zinc oxide (IZO) or indium tin oxide (ITO). The bridge electrode 230 and the sensing electrode 202 may include the same material or mutually different materials.

The sensing electrode 202 may be depicted in a rhombus shape in the drawings but, the embodiment is not limited thereto. The sensing electrode 202 may be formed in various shapes such as a polygonal shape including a triangular shape and a rectangular shape, a circular shape, a linear shape, an H-shape or an elliptical shape.

The bridge electrode 230 may be provided, for example, in a bar shape. In detail, the bridge electrodes 230 may be spaced apart from each other by a predetermined interval while being provided in the bar shape. The bridge electrode 230 may serve as a connecting electrode for connecting first sensing electrodes 210 or second sensing electrodes 220 to each other.

The sensing electrode 202 may be provided on the active area AA. The sensing electrode 202 disposed on the active area AA may perform a sensor function of sensing a touch. A first sensing electrode 210 extending in one direction and a second sensing electrode 220 extending in another direction different from the one direction may be disposed on the active area AA.

The first and second sensing electrodes 210 and 220 may be formed in various schemes according to a touch panel structure. The first and second sensing electrodes 210 and 220 may be formed on one surface of a substrate together. The first sensing electrode 210 may be formed on one surface of the substrate and the second sensing electrode 220 may be formed on one surface of another substrate disposed on the substrate. The first sensing electrode 210 may be formed on one surface of a first substrate disposed on the substrate, and the second sensing electrode 220 may be formed on a second substrate disposed on the first substrate. The first sensing electrode 210 may be formed on one surface of a glass or film disposed on the substrate, and the second sensing electrode 220 may be formed on an opposite surface of the glass or film.

As describe above, the touch panel according to the embodiment may have various structures according to the formation positions of the first and second sensing electrodes 210 and 220. However, the embodiment is not limited to the above, and the first and second sensing electrodes 210 and 220 may be formed at various positions.

If the input by a finger or input device touches the touch panel, the variation of capacitance may occur at the part touched with the input device, and the touched part subject to the variation of the capacitance may be detected as a touch point.

A printing layer 250 may be disposed in the inactive area UA. The printing layer 250 may extend along an edge of the substrate 100. The printing layer 250 may be formed through single tone printing, double tone printing or three tone printing. The printing layer 250 may be formed by coating black or white ink according to a desired outer appearance. The printing layer 250 may allow a wire 320, which will be described below, not to be seen from an outside. In addition, a pattern for forming a desired logo may be formed on the printing layer 250.

The wire 320 for electrically connecting the sensing electrode 202 may be formed in the unactive area UA. One end of the wire 320 may be connected to the sensing electrode 202 and the other end of the wire 320 may be connected to the printed circuit board 700. The wire 320 may be connected to the sensing electrode 202 and drawn out to a top or bottom end of the substrate 100. Further, a third pad part 800 may be disposed to the other end of the wire 320 such that the wire 320 may be connected to the printed circuit board 700.

The ground wire 370 may be disposed adjacent to the wire 320. A width of the ground wire 370 may be greater than that of the wire 320. The ground wire 370 prevents static electricity or ESD in the touch panel. The static electricity or ESD moves along a path of the ground wire 370 so that the static electricity or ESD can be prevented from being introduced into the touch panel. The ground wire 370 is disposed along the edge of the substrate 100 so that the static electricity or ESD can be effectively prevented from being introduced into the touch panel. The ground wire 370 may be disposed along the entire edge of the substrate 100. The ground wire 370 may be connected to the printed circuit board 700 so that the ESD in the touch panel can be discharged as an electrical signal. Thus, signal interference is prevented so that accuracy and reliability of a touch can be improved. The ground wire 370 may include a material equal or similar to the wire 320.

Figure 10:
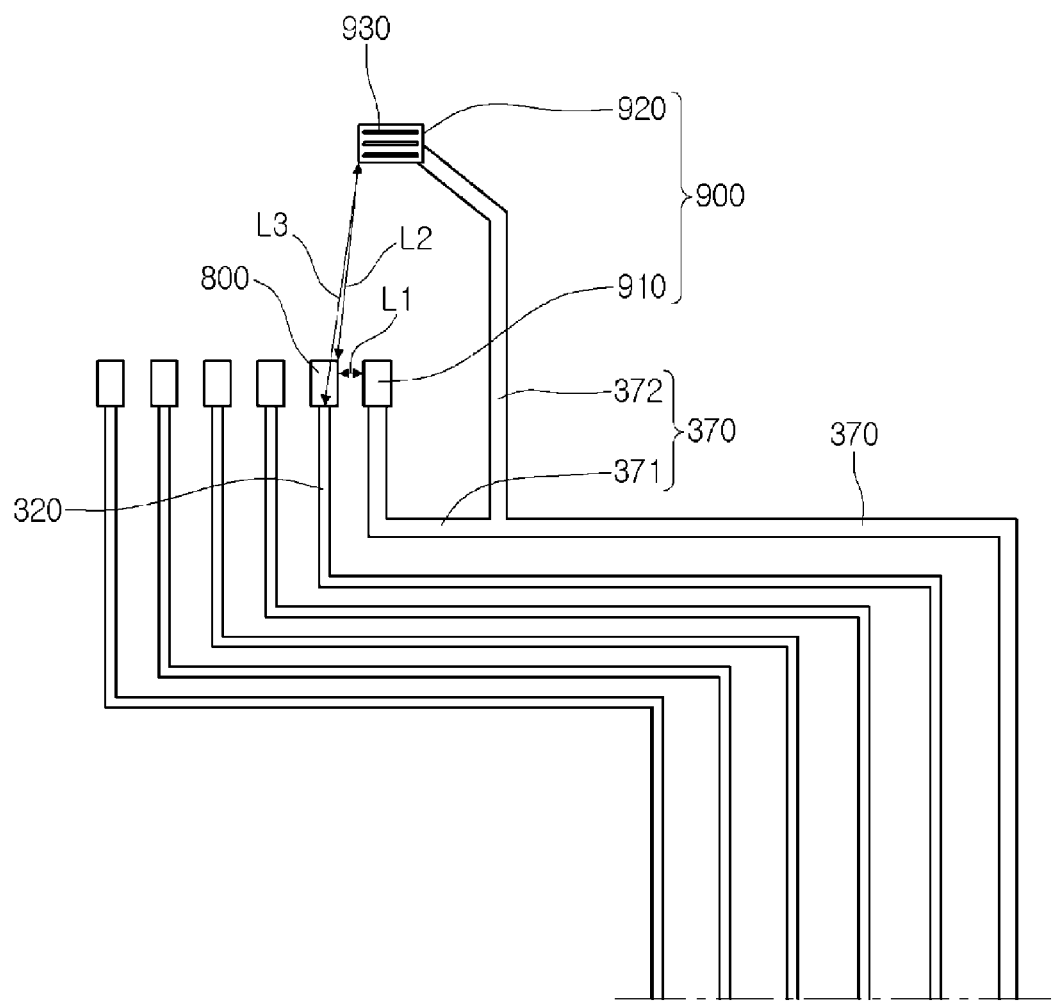
FIG. 10 is an enlarged view showing part A of FIG. 8.

Referring to FIG. 10, the ground wire 370 may include first and second sub-ground wires 371 and 372. A second pad part 910 may be disposed at one end of the first sub-ground wire 371. The second pad part 910 may be disposed to be adjacent to a third pad part 800. The second and third pad parts 910 and 800 may be connected to the same printed circuit board.

The second sub-ground wire 372 may be branched from the first sub-ground wire 371. The second sub-ground wire 372 may extend toward an end of the substrate 100. That is, an end of the second sub-ground wire 372 may be disposed at an outside of the printed circuit board 700.

Figure 9:
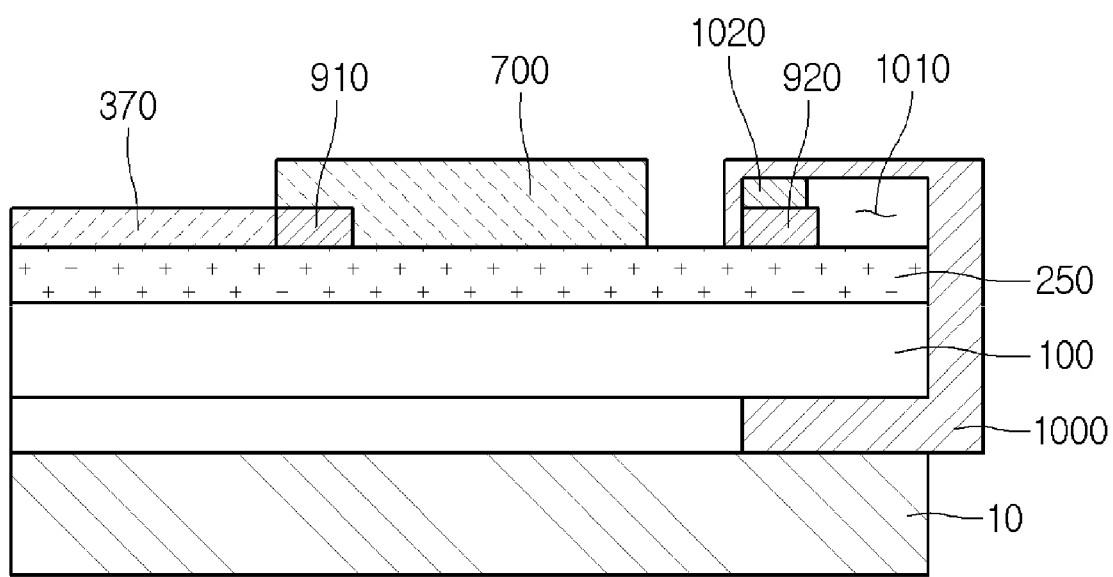
FIG. 9 is a sectional view taken along line I-I' of FIG. 8.

A first pad part 920 may be disposed at one end of the second sub-ground wire 372. A long side of the first pad part 920 may extend along a short side of the substrate 100. A width of the first pad part 920 may be larger than that of the second sub-ground wire 372. Referring to FIGS. 8 and 9, the first pad part 920 may be disposed at an outside of the printed circuit board 700. The first pad part 920 may be spaced apart from the second and third pad parts 910 and 800 by a constant distance.

Referring to FIG. 10, an interval L2 between the first and third pad parts 920 and 800 may be larger than that L1 between the second and third pad parts 910 and 800. The first pad part 920 may be disposed on the substrate 100 far away from the second pad part 910.

The first pad part 920 may be spaced apart from the wire 320 by a constant interval. The interval L3 between the first pad part 920 and the wire 320 may be in the range of 1 mm to 10 mm.

The first pad part 920 may include an open area 930. The open area 930 may allow a portion of the first pad part 920 to be exposed therethrough. The open area 930 may have a slit shape extending substantially in parallel with a long side of the first pad part 920. The open area 930 may include a plurality of open areas.

The process can be advantageously performed when the first pad part 920 is formed through the open area 930 by a printing process. Precise and uniform printability may be secured. Even though a crack or defect is generated at a portion of the first pad part 920 disposed at an edge of the substrate 100, the plurality of open areas 930 may prevent the crack from being developed. Since there exist plural open areas 930, the number of electric connection paths may be increased and, even if defects occur in one part of the electric connection paths, the electric connection may be maintained through other parts of the electric connection paths. The defect occurring in the part of the electric connections may not exert an influence on entire characteristics of the first pad part 920.

Referring to FIGS. 7 and 9, the touch panel may be disposed in a set cover 1000. A display panel 10 may be disposed at a low portion of the touch panel and the set cover 100 may be disposed between the display panel 10 and the touch panel. The set cover 100 may support the touch panel. The set cover 1000 may include a receiving part 1010 and the touch panel may be disposed in the receiving part 1010. The set cover 1000 may be formed in a rectangular frame shape. In addition, the set cover 1000 may include plastic or metal.

The set cover 1000 may include a second ground wire 1020. The second ground wire 1020 may be disposed inside the set cover 1000. The ground wire 1020 may be disposed along a rim of the set cover 1000. The second ground wire 1020 may effectively block the static electricity or ESD generated from an outside of the touch panel.

The second ground wire 1020 may be connected to the first pad part 920 disposed on the substrate 100. The second ground wire 1020 may be connected to the first pad part 920 disposed at an end of the second sub-ground wire 372. The set cover 1000 may make direct contact with the first pad part 920. The embodiment is not limited to the above, and the first pad part 920 may be connected to the set cover 1000.

When the static electricity or ESD is generated from an outside to be introduced in to the touch panel, the static electricity or ESD may be effective dispersed through the first pad part 920 and the second wire 1020 connected to the first pad part 920. The third pad part 800 for electrically connecting the wire 320 in the touch panel may be prevented from being damaged due to the static electricity or ESD. The damage to the wires and the third pad 800 proximate to the ground wire 370 may be reduced. Even though ESD damage occurs, the static electricity or ESD may be discharged to an outside of the set cover 1000 through the second ground wire 372 and the first pad part 920. Thus, signal interference is prevented, so that the accuracy and reliability of a touch can be improved.

Figure 11:
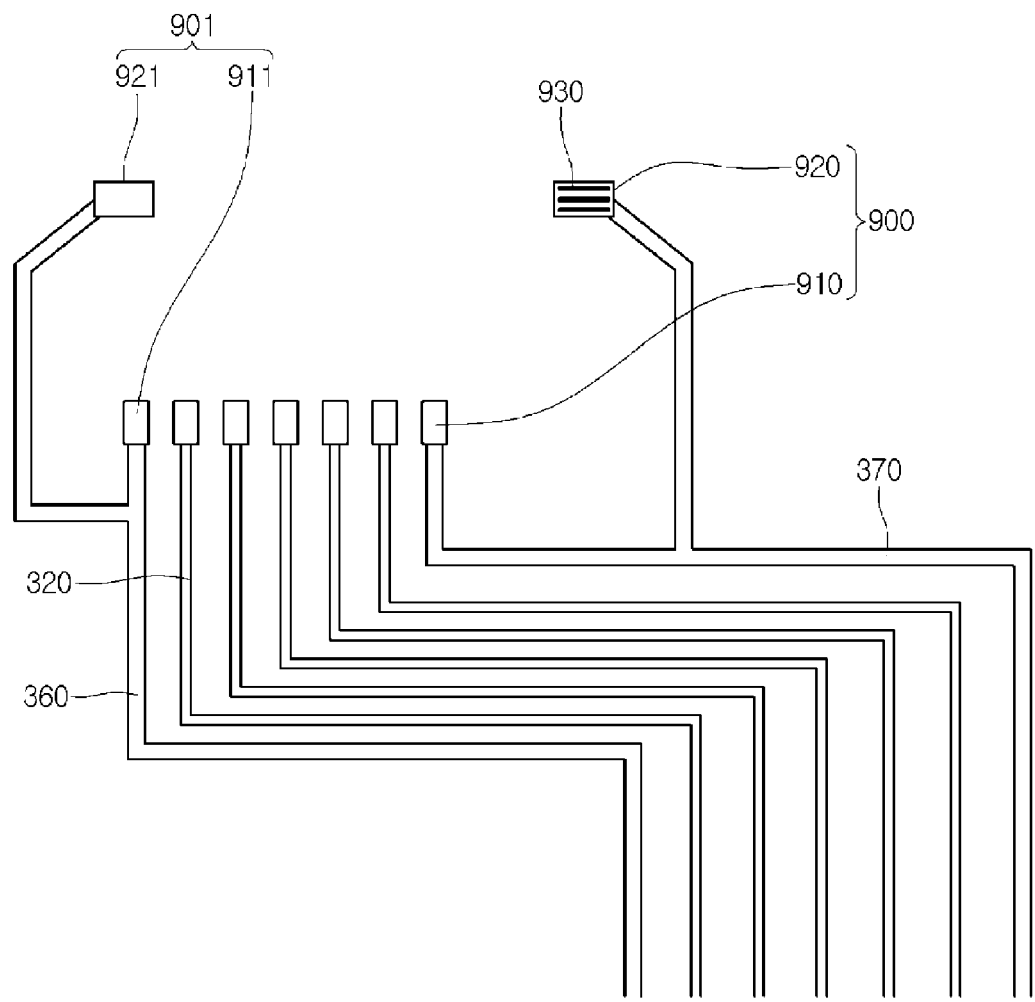
FIG. 11 is an enlarged view showing a touch panel according to still another embodiment.

Referring to FIG. 11, the ground wires 360 and 370 may be disposed at both sides of the wire 320. That is, the ground wires 360 and 370 may be disposed at the outmost and inmost portions of the substrate 100, respectively. ESD protection effect may be maximized in the touch panel. The ground wire 360 disposed at the inmost portion is also branched so that the second pad part 911 and the third pad part 921 can be connected to an end of the ground wire 360.

Figure 12:
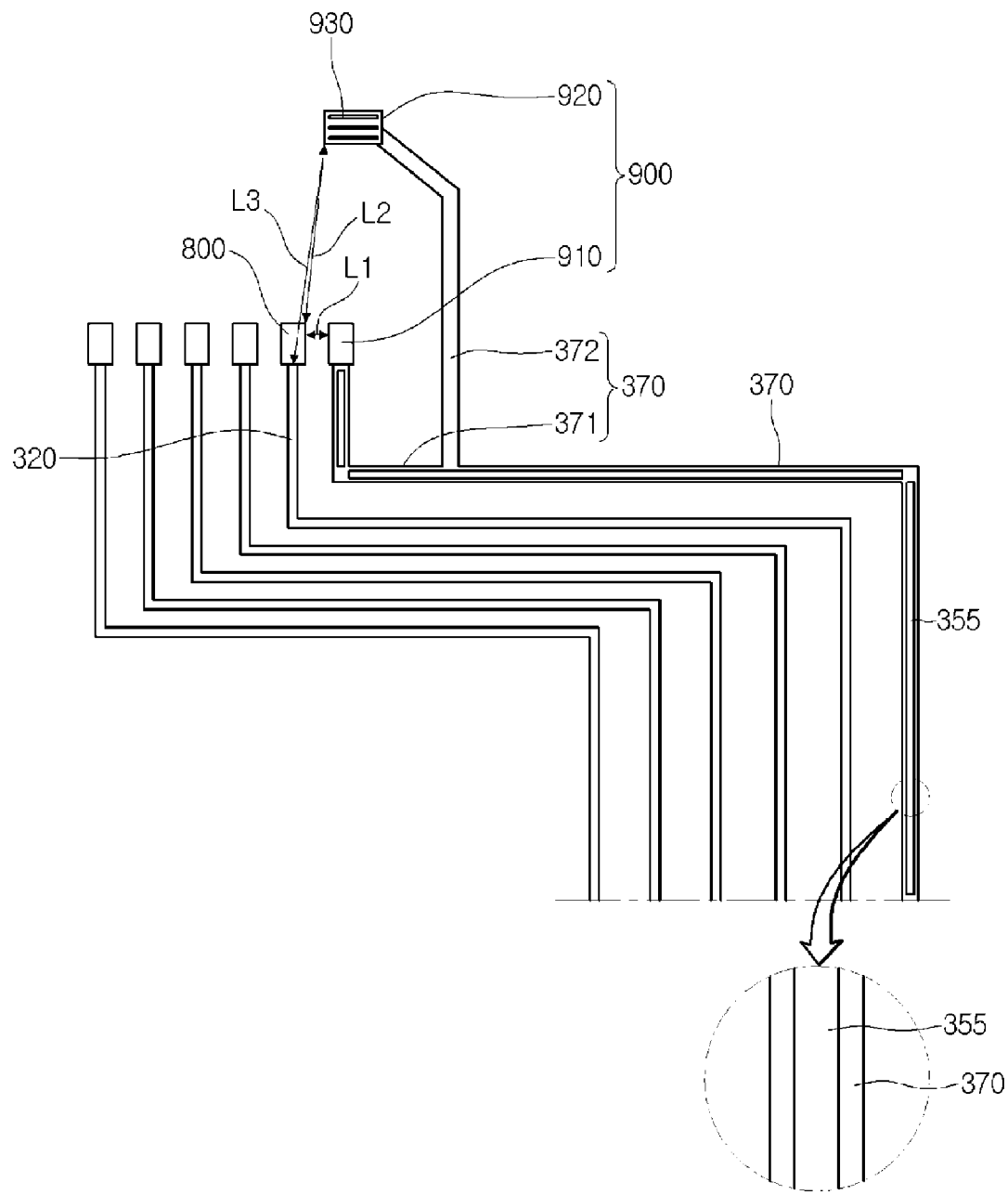
FIG. 12 is a partial enlarged view showing a touch panel according to a third embodiment.

FIG. 12 is a partial enlarged view showing a touch panel according to a third embodiment. The touch panel according to the third embodiment may employ technical features of the second embodiment. According to the touch panel of the third embodiment, a third dummy part 355 may be formed in a ground wire 350. The third dummy part 355 may include an open area and the top surface of the printing layer 250 may be exposed through the third dummy part 355.

The third dummy part 355 may substantially extend in one direction. In detail, the third dummy part 355 may include a bar shape extending in one direction. The third dummy part 355 may extend in a longitudinal direction of the ground wire 370.

The third embodiment is organically connected to the technical features of the second embodiment, so that precise and uniform printability may be secured. In addition, the ground wire may be prevented from being electrically disconnected.

Figure 13:
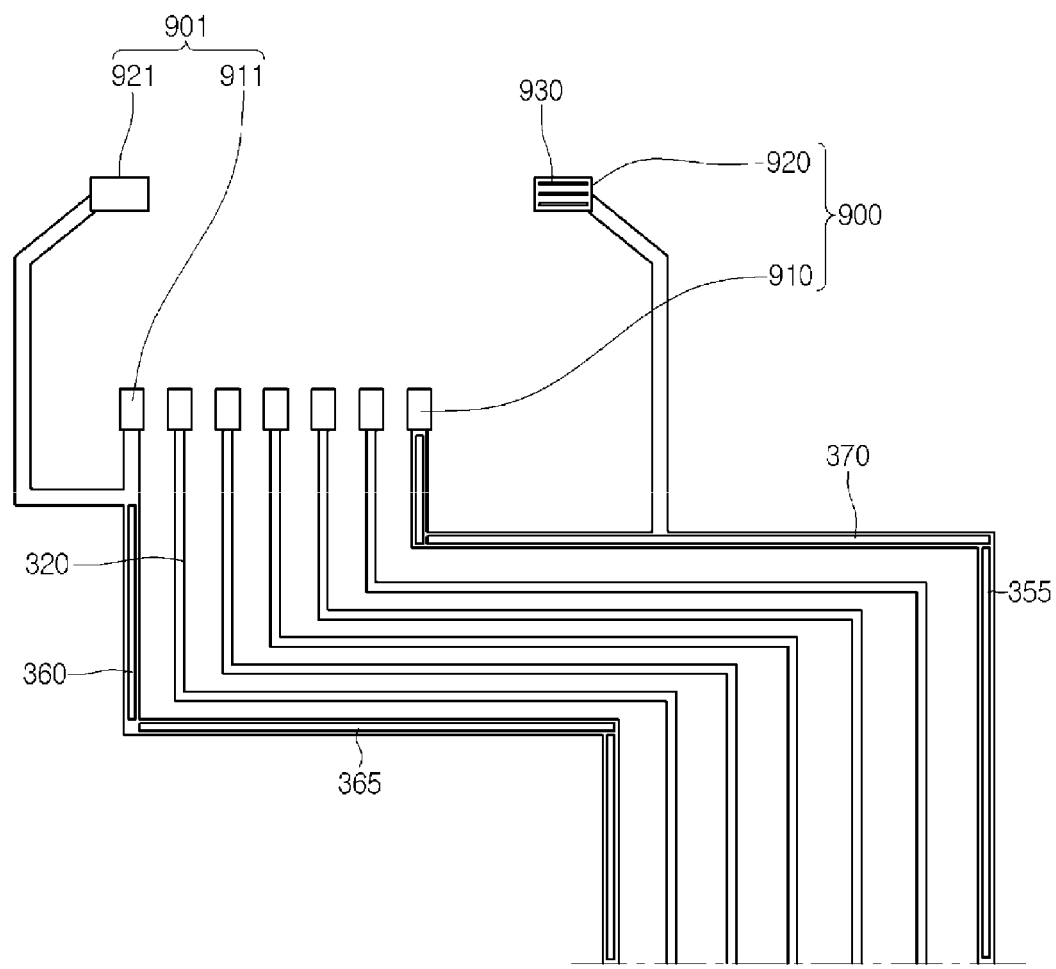
FIG. 13 is another partial enlarged view showing a touch panel according to a third embodiment.

FIG. 13 is a partial enlarged view showing a touch panel according to a third embodiment. A fourth dummy part 365 may be formed in a ground wire 360. The fourth dummy part 365 may include an open area and the top surface of the printing layer 250 may be exposed through the fourth dummy part 365.

Figure 14:
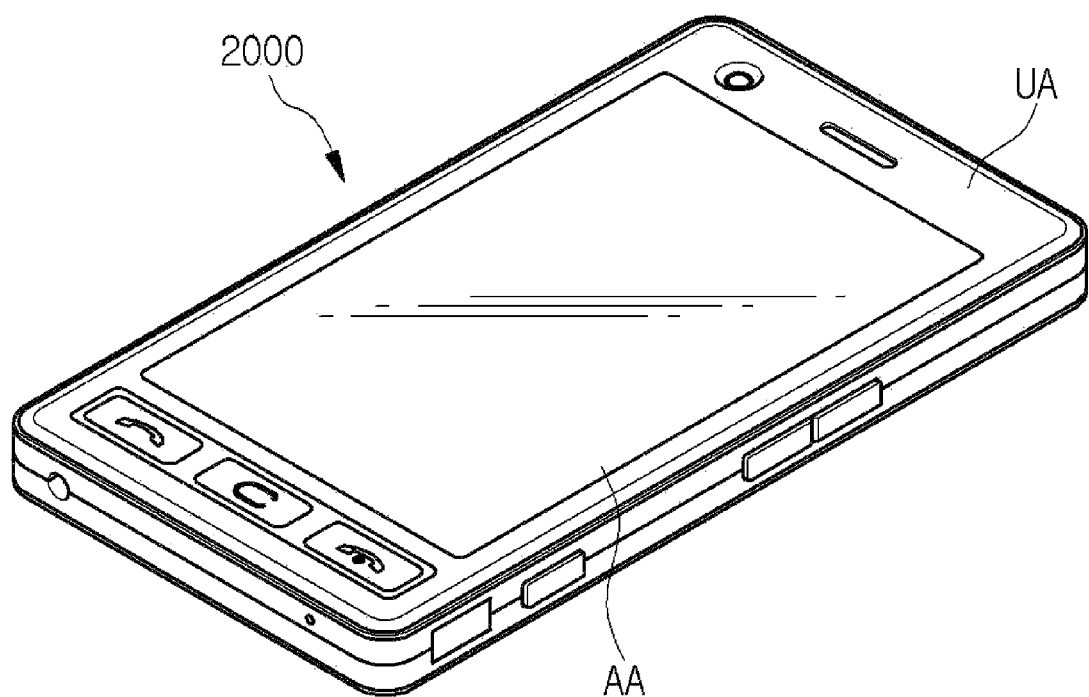
FIG. 14 is a view showing one example of a display to which a touch panel is applied according to an embodiment.

FIG. 14 is a view showing one example of a display including the above-described touch panel. As one example of the display, a mobile terminal will be described. The mobile terminal 2000 may include an active area AA and an unactive area UA. The active area may sense a touch signal when a finger touches the active area AA, and an instruction icon pattern part and a logo may be formed in the unactive area UA. Although the mobile terminal is shown in FIG. 14 as one example, the electrode member and the touch panel described above may be applied to various electronic appliances, such as vehicles or home appliances, employing a display, as well as the mobile terminal.

The embodiment provides a touch window having the improved reliability, and a display with the same.

According to the embodiment, there is provided a touch panel including: a substrate; a sensing electrode disposed on the substrate to sense a position; a wire electrically connected to the sensing electrode; and a ground wire adjacent to the wire, wherein the ground wire includes a first dummy part, and the first dummy extends in one direction.

According to the embodiment, there is provided a touch panel including: a substrate; a sensing electrode one the substrate; a wire having one end electrically connected to the sensing electrode; a printed circuit board electrically connected to an opposite end of the wire; and a ground wire adjacent to the wire, wherein an end of the ground wire is disposed at an outside of the printed circuit board.

According to the embodiment, there is provided a display including: a set cover including a receiving part; and a touch panel disposed in the receiving part, wherein the touch panel includes: a substrate; a sensing electrode on the substrate; a wire having one end electrically connected to the sensing electrode; a printed circuit board electrically connected to an opposite end of the wire; a first ground wire adjacent to the wire; a first ground wire adjacent to the wire; and a first pad part disposed at an end of the first ground wire, wherein the set cover makes direct contact with the end of the first pad part.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A touch panel comprising:
a substrate including an active area and an inactive area;
a printing layer provided on the inactive area of the substrate
a sensing electrode provided on the active area of the substrate to sense a position;
a wire electrically connected to the sensing electrode; and
a ground wire adjacent to the wire,
wherein the ground wire includes a first open part, and the first open part extends in one direction,
wherein the first open part exposes a top surface of the printing layer,
wherein the ground wire is arranged along an edge of the substrate,
wherein the ground wire is provided integrally to a first edge area, a second edge area and a third edge area of the substrate,
wherein the first open part is provided separately on the first edge area, the second edge area and the third edge area,
wherein the first open part includes a bar shape,
wherein a ratio of a width of the ground wire to a width of the open part is in a range of 15:1 to 5:1,
wherein the wire and the ground wire include metallic paste material.

2. The touch panel of claim 1, wherein the first open part extends in a longitudinal direction of the ground wire.

3. The touch panel of claim 1, wherein the first open part has directionality equal to directionality of the ground wire.

4. The touch panel of claim 1, wherein the first open part has a width in a range of 20 μm to 60 μm.

5. The touch panel of claim 1, wherein a width of the ground wire is larger than a width of the wire.

6. The touch panel of claim 1, further including a second open part in the wire.

7. The touch panel of claim 6, wherein the second open part exposes a top surface of the printing layer.

8. The touch panel of claim 6, wherein a ratio of a width of the ground wire to a width of the second open part is in a range of 15:1 to 5:1.

9. The touch panel of claim 1, wherein the ground wire is disposed along an entire edge of the substrate.

10. The touch panel of claim 1, wherein the ground wire include a material equal or similar to the wire.

11. The touch panel of claim 1, wherein the ground wire includes a binder and conductive particles,
   the binder includes an organic binder,
   the conductive particles include a metal, and
   the conductive particles are uniformly distributed in the binder.

12. The touch panel of claim 11, wherein the binder has a content of 5% by weight to 15% by weight based on the whole weight of the ground wire.

13. The touch panel of claim 1, further including an electrode pad on the substrate,
   wherein the electrode pad is placed at ends of the wire and the ground wire, and
   wherein the electrode pad makes contact with a printed circuit board.

14. The touch panel of claim 13, wherein a width of the ground wire is wider than a width of the electrode pad.

15. The touch panel of claim 13, wherein a width of the wire corresponds to the width of the electrode pad.

16. The touch panel of claim 1, wherein the ground wire includes a first ground wire and a second ground wire,
   the first ground wire and the second ground wire are provided at both sides of the wire,
   the first ground wire is provided at outmost portion of the substrate, and
   the second ground wire is provided between the sensing electrode and wire.

* * * * *